July 11, 1944.   F. X. LAMB   2,353,618
DAMPING DEVICE FOR ELECTRICAL INSTRUMENTS
Original Filed April 19, 1941
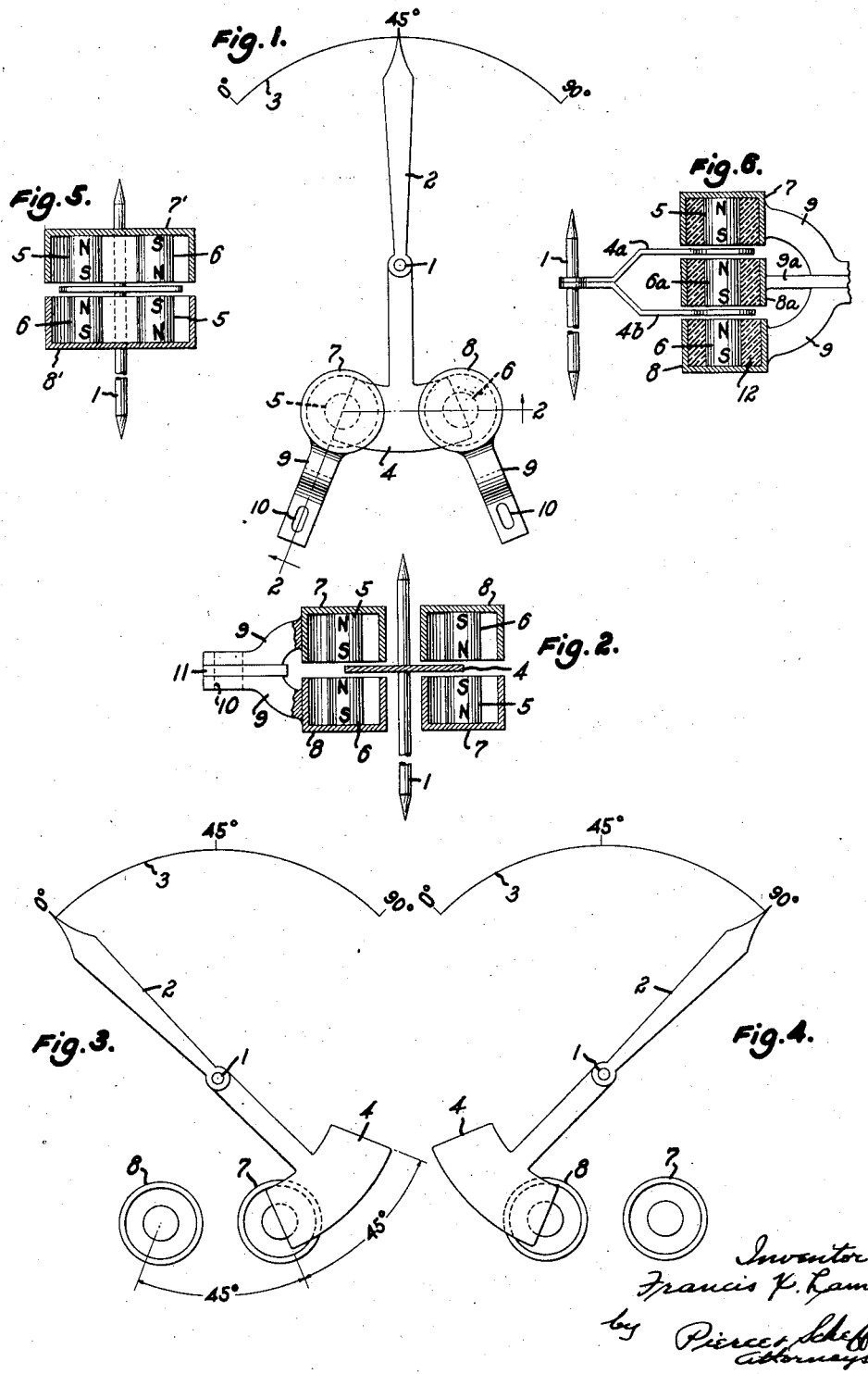

Patented July 11, 1944

2,353,618

UNITED STATES PATENT OFFICE 2,353,618

DAMPING DEVICE FOR ELECTRICAL INSTRUMENTS

Francis X. Lamb, East Orange, N. J., assignor to Weston Electrical Instrument Corporation, Newark, N. J., a corporation of New Jersey Original application April 19, 1941, Serial No. 389,447. Divided and this application February 24, 1942, Serial No. 432,139

7 Claims. (Cl. 171—95)

This invention relates to damping devices for electrical measuring instruments, and more particularly to damping devices for use with alternating current instruments.

This application is a division of my copending application Serial No. 389,447, filed April 19, 1941. The prior application discloses and claims magnetic damping devices in the form of small bar magnets within shielding shells of soft iron or the like, and cooperating elements of magnetic material spaced from the magnets and shells to leave a small gap within which the instrument damping vane moves. The present invention relates particularly to magnetic damping systems of this novel type in which a plurality of magnets are angularly or axially spaced to form a plurality of gaps or flux paths that are cut by one or more damping vanes.

An object of this invention is to provide a magnetic damping system in which a plurality of shielded bar magnets are so spaced as to provide a plurality of gaps in which one or more damping vanes are movable. An object is to provide a magnetic damping system including angularly spaced gaps, and a cooperating damping vane having an angular length substantially less than the angular displacement of the instrument movement. An object is to provide a magnetic damping system of the type stated in which the magnet elements are of bar form and substantially completely shielded by shells of soft iron or the like. Another object is to provide a magnetic damping system including a plurality of sets of axially alined bar magnets within a single shielding system, the magnets of each set having unlike poles adjacent each other and spaced apart to provide a plurality of alined gaps in a single magnetic circuit.

These and other objects and advantages of the invention will be apparent from the following specification when taken with the accompanying drawing in which:

Fig. 1 is a schematic plan view of an electrical measuring instrument including a magnetic damping system embodying the invention;

Fig. 2 is a vertical section of the same as seen on the plane indicated by line 2—2 of Fig. 1;

Figs. 3 and 4 are schematic plan views, with the upper damping elements omitted, showing alternative end positions of the instrument pointer of Fig. 1;

Fig. 5 is a vertical section through a magnetic damping structure that includes a plurality of magnetic damping units within a single shielding shell; and Fig. 6 is a vertical section through a magnetic damping device in which a plurality of vanes move through axially spaced magnetic gaps.

The embodiment shown in Figs. 1 to 4, inclusive, eliminates certain difficulties encountered with prior magnetic damping systems for instrument movements having a pointer deflection of 90°. Such prior systems included a damping vane of an angular length of 90° and required an unobstructed space of 180° within the instrument. The damping vane of 90° spread imposed a relatively heavy load upon the bearings of the moving system, a vane of that angular length was difficult to manufacture and assemble without becoming warped or bent, and even a slight tilting of the instrument staff or of the parts cooperating with the vane would result in a mechanical contact of the parts. These difficulties, and those due to the mechanical vibration of a large damping vane, are eliminated or reduced by employing a plurality of angularly spaced magnetic damping units and a vane of correspondingly reduced angular length.

As shown in Figs. 1 and 2, the staff 1 supports the instrument moving system (not shown) and carries a pointer 2 that is movable along an arcuate scale 3, of 90° extent, that may be graduated in any desired values. The staff also carries a vane 4, usually a thin sheet of aluminum, that moves through the flux gaps of a plurality of circumferentially spaced damping units, the vane 4 having an angular length equal to the angular scale length divided by the number of damping units. In the illustrated example, there are two damping units spaced circumferentially by 45°, and the damping vane has an angular length of 45°.

Each damping unit may be of any of the types described in my earlier application and includes a short bar magnet of a material of high coercive force, for example "Alnico," within a cup-shaped shield of soft iron or the like, and magnetic material spaced from the ends of the bar magnet and shield to form the air gap in the magnetic flux path. The illustrated embodiments are of the general type shown in Figs. 1 and 2 of the earlier application and employ a second bar magnet and shielding shell as the magnetic material that cooperates with the first magnet and shell to define the flux gap.

Each damping unit comprises two small bar magnets 5, 6 that lie along a common axis and have adjacent poles spaced apart to form a flux gap. Cup-shaped shielding shells 7, 8, preferably of soft iron, are secured to and extend about the magnets 5, 6, respectively. It is desirable, but not essential, that the shielding shells be coaxial with the associated magnets, and that the radial clearance between the magnets and their shells be greater than the length of the flux gap between the magnets. The magnets are permanently secured to their shielding shells by cementing, welding or, as will be described later, by a molded plastic in the annular space between the magnet and its shell.

Each shielding shell has an integral or attached bracket arm 9 for supporting the magnetic system upon a fixed part, not shown, of the instrument or the instrument casing. The bracket arms preferably have elongated slots 10 to permit adjustment of the magnetic system radially of the damping vane 4, and shims or spacing members 11 may be inserted between the bracket arms 9 to adjust the length of the flux path between the magnets 5, 6 and the soft iron shells 7, 8.

The shims 11 and the bracket arms 9, when not integral with the shells, may be made either of magnetic or non-magnetic material depending upon the desired characteristics of the flux path. When the bracket arms and shims are of non-magnetic material, the flux path includes the gap between the magnets 5, 6 and the gap between the rims of the shells 7, 8. When the bracket arms and shims are of magnetic material, the return flux path of magnets 5, 6 is through the brackets and shims, and there is substantially no magnetic flux between the rims of the magnetic shells 7, 8.

The small size of each magnetic damping unit is indicated by the following data as to one practical embodiment that is typical of the invention. The magnets 5, 6 were of "Alnico," a permanent magnet material of high coercive force, and had a diameter of 0.3 inch, a length of 0.4 inch, and the magnets and their shield shells were spaced apart by 0.050 inch. The soft iron shielding shells 7, 8 had a radial thickness of approximately 0.025 inch, and the damping vane 4 was an aluminum sheet approximately 0.010 inch in thickness. This damping system afforded at least critical damping of an ordinary movable iron type instrument.

It is to be noted that the magnetic poles of the damping units are reversely arranged to neutralize the small magnetic leakage from the substantially completely shielded magnetic systems. The substantially uniform magnetic damping of the instrument movement by a vane having a short angular length, equal to the angular scale length divided by the number of damping units, will be apparent from a consideration of Figs. 1, 3 and 4. At the midposition of the instrument pointer 2, the damping vane 4 lies within a portion of the magnetic flux paths of the respective magnetic damping devices, as shown in Fig. 1. At zero position of the pointer 2, as shown in Fig. 3, the damping vane 4 moves within the flux gap or gaps of only one damping unit and, as shown in Fig. 4, the vane 4 moves within the flux gap or gaps of the other damping unit when the pointer 2 is at the other limit of the angular movement of the moving system. Through approximately 40° of travel of the pointer 2 from zero position, the damping vane 4 moves in the flux gap or gaps of only the right hand damping unit. The damping vane then enters the flux gap or gaps of the other magnetic damping unit as the pointer approaches its central position but the vane 4 simultaneously moves out of the flux gap or gaps of the first damping unit. During displacement of the pointer 2 in the upper half of its range of movement, the vane moves in the flux gap or gaps of only the second or left hand damping unit, see Fig. 4. The instrument movement is thus substantially uniformly damped by a magnetic vane of short angular length.

As shown in Fig. 5, the dual damping units may be replaced by a unitary construction in which two sets of reversely arranged pairs of permanent magnets 5, 6 are secured to and within a single pair of soft iron shells 7', 8'. The major part of the magnetic flux follows a circular path through the magnets and only a small flux traverses the air gap between the soft iron shells. Magnetic leakage is thus reduced to a minimum and the magnets are effectively shielded from external fields.

A series of miniature bar magnets 5, 6, 6a may be axially alined, with unlike poles adjacent each other to provide a multiplicity of flux gap paths in which the axially spaced damping vanes 4a, 4b are movable. The magnets 5, 6 are mounted within shielding shells 7, 8, respectively, of soft iron, and the intermediate magnet 6a is surrounded by a soft iron shell 8a. The several bar magnets are supported within their respective soft iron shells by a molded insulating sleeve 12 of rubber or a synthetic resin. The shells 7, 8 have integral or attached bracket arms 9, as previously described, and the shell 8a has a mounting arm 9a that fits between the mounting arms 9, 9.

It is to be understood that the invention is not limited to the specific constructions herein shown and described, and that various changes may be made in the several parts, their relative sizes, shapes and arrangements without departure from the spirit of my invention as set forth in the following claims.

I claim:

1. A magnetic damping system for a pivotally mounted instrument movement displaceable over a predetermined angular range, said damping system including a plurality of magnetic damping units spaced angularly about the pivotal axis of said instrument movement, each damping unit including a bar magnet parallel to said pivotal axis and magnetic material means spaced axially from a polar surface of the bar magnet to provide a flux gap, and a flat damping vane secured to said instrument movement for movement through said flux gaps, the angular spread of the damping vane being approximately equal to the quotient of the angular scale length of the instrument divided by the number of magnetic damping units.

2. A magnetic damping system as claimed in claim 1, wherein each magnetic damping unit includes a cup-shaped shell of soft iron material enclosing the miniature bar magnet, the shell terminating substantially in transverse alinement with said polar face of the bar magnet, and said magnetic material means comprises a similar miniature bar magnet within a cup-shaped shell of soft iron, the adjacent ends of the bar magnets being of opposite polarity and the opposite ends of said bar magnets being connected magnetically to their respective shells, thereby including both shells in the magnetic flux path and providing a pair of serially arranged magnetic flux gaps.

3. A magnetic damping system as claimed in claim 1, wherein said plurality of magnetic damping units includes a single shell of soft iron material enclosing said magnets and connected mechanically and magnetically to the same, said magnets having unlike poles connected magnetically to said shell, and said magnetic material means is spaced from said magnets and shell to complete a main magnetic circuit through said magnets and a leakage flux circuit through said shell.

4. A magnetic damping unit for use with an instrument movement carrying a plurality of axially spaced flat damping vanes, said unit comprising a series of axially alined miniature bar magnets having unlike poles opposed to and spaced from each other, and shells of ferromagnetic material surrounding the respective bar magnets, said shells being axially spaced to provide openings alined transversely with the flux gaps between the spaced unlike poles of the bar magnets.

5. A magnetic damping system for a pivotally mounted instrument movement, said damping system comprising a plurality of bar magnets parallel to the pivotal axis of the instrument movement and having polar faces spaced apart to form a plurality of flux gaps, a shielding shell of magnetic material substantially enclosing the magnets and cooperating therewith to form the magnetic flux path, said magnetic material shell having opposed edges terminating substantially in transverse alinement with the spaced polar faces of said magnets to form a flux gap in alinement with each flux gap between said bar magnets, and vane means displaceable through said flux gaps of the magnets and shell.

6. A magnetic damping system for a pivotally mounted instrument movement carrying a radially extending damping vane, said damping system comprising a plurality of bar magnets parallel to the axis of the instrument movement and circumferentially spaced from each other, said bar magnets having polar faces in substantially transverse alinement, cup-shaped shield means of magnetic material substantially enclosing said magnets and including portions in magnetic contact with one set of polar faces of said magnets, said shield means terminating substantially in transverse alinement with the other set of polar faces of the said magnets, and magnetic material means spaced axially from said bar magnets and shield means to form transversely alined flux gaps in the magnetic flux path through said magnets and shield means, said damping vane being movable in said flux gaps by said instrument movement.

7. A magnetic damping system as recited in claim 6, wherein the circumferential spacing of the bar magnets is approximately equal to the angular spread of the damping vane.

FRANCIS X. LAMB.